US 7,797,222 B2

(12) United States Patent
Levy et al.

(10) Patent No.: US 7,797,222 B2
(45) Date of Patent: Sep. 14, 2010

(54) METHOD AND APPARATUS FOR HOLDING AN ONLINE LIVE AUCTION TO COMBINE FEATURES OF BOTH THE INTERNET AND TRADITIONAL, REAL WORLD AUCTIONS

(75) Inventors: Daniele Levy, San Francisco, CA (US); Brad Handler, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 881 days.

(21) Appl. No.: 11/264,526

(22) Filed: Nov. 1, 2005

(65) Prior Publication Data
US 2006/0112003 A1 May 25, 2006

Related U.S. Application Data

(63) Continuation of application No. 09/620,809, filed on Jul. 21, 2000, which is a continuation-in-part of application No. 09/457,466, filed on Dec. 8, 1999, now Pat. No. 7,162,446.

(51) Int. Cl.
*G06Q 17/00* (2006.01)
(52) U.S. Cl. ............................. 705/37; 705/27; 705/26; 705/80; 705/40
(58) Field of Classification Search .................. 705/37, 705/27, 26, 80, 40
See application file for complete search history.

(56) References Cited

U.S. PATENT DOCUMENTS

| 3,573,747 | A | 4/1971 | Adams et al. |
| 3,581,072 | A | 5/1971 | Nymeyer |
| 4,412,287 | A | 10/1983 | Braddock, III |
| 4,674,044 | A | 6/1987 | Kalmus et al. |

(Continued)

FOREIGN PATENT DOCUMENTS

CA 2253543 3/1997

(Continued)

OTHER PUBLICATIONS

"Onsale Joins Fray as Online Shopping Picks Up Speed: Internet Booms", *Computer Reseller News*, (Jun. 5, 1995),73.

(Continued)

*Primary Examiner*—Daniel S Felten
(74) *Attorney, Agent, or Firm*—Schwegman, Lundberg & Woessner P.A.

(57) ABSTRACT

A method and apparatus are provided for conducting a live auction that combines various features of traditional and online auctions. According to one aspect of the present invention, the live auction includes a live, in-person auction component and a real-time online bidding environment component. Bidding information associated with an item in the online bidding environment is updated to reflect a current bid associated with the item in the live, in-person auction. During the live, in-person auction, a bid is be accepted from an online bidder in the online environment that reflects the online bidder's bid price for the item. Subsequently, the system bids on behalf of the online bidder against other online bidders as well as one or more live bidders that are participating in the live, in-person. As such, the live auction enables real-time online bidding in a live, in-person auction.

29 Claims, 13 Drawing Sheets

U.S. PATENT DOCUMENTS

| | | |
|---|---|---|
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,539,450 A | 7/1996 | Handelman |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,655 A | 6/1998 | Hoffman |
| 5,771,291 A | 6/1998 | Newton et al. |
| 5,771,380 A | 6/1998 | Tanaka et al. |
| 5,790,790 A | 8/1998 | Smith et al. |
| 5,794,216 A | 8/1998 | Brown |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,974,398 A | 10/1999 | Hanson et al. |
| 5,974,412 A | 10/1999 | Hazlehurst et al. |
| 5,991,739 A | 11/1999 | Cupps et al. |
| 6,012,045 A | 1/2000 | Barzilai et al. |
| 6,023,685 A | 2/2000 | Brett et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,078,906 A | 6/2000 | Huberman |
| 6,085,176 A | 7/2000 | Woolston |
| 6,104,815 A | 8/2000 | Alcorn et al. |
| 6,119,137 A | 9/2000 | Smith et al. |
| 6,141,653 A | 10/2000 | Conklin et al. |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,415,269 B1 | 7/2002 | Dinwoodie |
| 6,449,601 B1 * | 9/2002 | Friedland et al. ............... 705/37 |
| 6,523,037 B1 | 2/2003 | Monahan et al. |
| 7,162,446 B1 | 1/2007 | Handler |
| 2003/0131006 A1 | 7/2003 | Monahan et al. |

FOREIGN PATENT DOCUMENTS

| | | |
|---|---|---|
| FR | 2658635 | 8/1991 |
| JP | 04-342065 | 11/1992 |
| JP | 10-229555 | 8/1998 |
| JP | 2005-050288 | 2/2005 |
| KR | 20000037331 A | 7/2000 |
| NL | 9300266 | 2/1993 |
| WO | WO-9215174 | 9/1992 |
| WO | WO-9422108 | 9/1994 |
| WO | WO-9517711 | 6/1995 |
| WO | WO-9634356 | 10/1996 |
| WO | WO-9737315 | 10/1997 |
| WO | WO-9737315 A1 | 10/1997 |
| WO | WO-9834187 | 8/1998 |
| WO | WO-9834187 A1 | 8/1998 |
| WO | WO-9835468 | 8/1998 |
| WO | WO-9963461 | 12/1999 |
| WO | WO-0022907 A2 | 4/2000 |
| WO | WO-0025218 | 5/2000 |
| WO | WO-0039735 A2 | 7/2000 |
| WO | WO-0141013 | 6/2001 |

OTHER PUBLICATIONS

"Onsale: Onsale Brings Thrill of Auctions and Bargain Hunting Online; Unique Internet retail service debuts with week-long charity auction for The Computer Museum in Boston", *Business Wire*, (May 24, 1995),3 pages.

AUCTIONS.YAHOO.COM, "Yahoo Auctions Website", Downloaded Oct. 23, 1998 from http://auctions.yahoo.com, (Oct. 23, 1998),Webpage.

AUCTIONUNIVERSE.COM, "Auction Universe Website", Downloaded Oct. 23, 1998 from http://www.auctionuniverse.com, (Oct. 23, 1998),Webpage.

Baumann, G. W., "Personal Optimized Decision/Transaction Program", *IBM Technical Disclosure Bulletin.*, (Jan. 1995),83-84.

Biais, Bruno , et al., "An empirical analysis of the limit order book and the order flow in the Paris Bourse", *Journal of Finance*, 50(5), (Dec. 1995), 1655-1689.

Business Wire, "Bid.com Announces www.dutchauction.com", *Business Wire*, Dialog File 16, Access No. 05914806, (Oct. 28, 1998),1464.

Business Wire, "Mediappraise Receives National Award For Web-based Technology That Enables Companies To Solve Thorny HR Problem", *Business Wire*, (Dec. 14, 1998),1-2.

Clemons, E , "Evaluating the prospects for alternative electronic securities", *Proceedings of ICIS 91: 12th International Conference on Information Systems*, (Dec. 16-18, 1991),53-61.

Cooper, J., "Going Going Gone! Tradition Gives Way to Technology", *British Telecom World*, Dialog File148, Access No. 04587041,(Mar. 1990).

Dunlap, C., "Going Once, Going Twice . . . Sold!", *Computer Reseller News*, (Dec. 1997),n766 PP:1.

Graham, I, "The Emergence of Linked Fish Markets in Europe", *EM—Electronic Commerce in Europe. EM—Electronic Markets*, 8(2), (Jul. 1998),29-32.

Hauser, R, "Anonymous Delivery of Goods in Electronic Commerce", *IBM Technical Disclosure Bulletin*, 39(3), (Mar. 1996),363-366.

Hess, C M., "Computerized Loan Organization System: An Industry Case Study of the Electronic Markets Hypothesis", *MIS Quarterly*, 18(3), (Sep. 1994),251-274.

Hong, Zhou, "Multilingual information retrieval system", *Proc. SPIE*, vol. 2916, Multimedia Storage and Archiving Systems, C-C. J. Kuo; Ed.,(Nov. 1996),33-44.

Klein, Stefan, "Introduction to Electronic Auctions", *EM—Electronic Auctions. EM—Electronic Markets*, vol. 7, No. 4, (Dec. 1997),3-6.

Lee, H G., "AUCNET: Electronic Intermediary for Used-Car Transactions", *EM—Electronic Auctions. EM—Electronic Markets*, 7(4), (Dec. 1997),24-28.

Lee, H. G., "Electronic brokerage and electronic auction: the impact of IT on market structures", *Proceedings of the Twenty-Ninth Hawaii International Conference on System Sciences*, vol. 4, (Jan. 3-6, 1996),397-406.

Liepins, P J., "A browser based image bank, useful tool or expensive toy?", *Med Inform*, 23(3), (Jul.-Sep. 1998),199-206.

Malone, Thomas W., "Electronic Markets and Electronic Hierarchies", *Communications of the ACM*, 30(6), (Jun. 1987),484-497.

Mardesich, Jodi, "Site Offers Clearance for End-of-Life Products—Onsale Takes Auction Gavel Electronic", *Computer Reseller News*, (Jul. 8, 1996),2 pages.

Massimb, Marcel, "Electronic Trading, Market Structure and Liquidity", *Financial Analysts Journal*, 50(1), (Jan./Feb. 1994),39-50.

Meade, Jim, "Visual 360: A Performance Appraisal System That's 'Fun'", *HR Magazine*, (Jul. 1999),1-3.

Mohan, Rakesh, "Text-based search of TV news stories", *SPIE*, vol. 2916, Multimedia Storage and Archiving Systems, C.-C. J. Kuo; Ed., (Nov. 1996),2-13.

Neo, Boon S., "The implementation of an electronic market for pig trading in Singapore", *Journal of Strategic Information Systems*, 1(5), (Dec. 1992),278-288.

NETGROCER.COM, "Netgrocer Website", downloaded Oct. 23, 1998 from Website http://www.netgrocer.com, (Oct. 23, 1998),Webpage.

ONSALE.COM, "Onsale Auction Website", Downloaded Oct. 23, 1998 from http://www.onsale.com, (Oct. 23, 1998),Webpage.

Post, D L., "Application of auctions as a pricing mechanism for the interchange of electric power", *IEEE Transactions on Power Systems*, 10(3), (Aug. 1995),1580-1584.

PR Newswire, "MOAI Technologies Announce Live Exchange 2.1", *PR Newswire*, (Sep. 14, 1998).

Preist, Chris, "Adaptive Agents in a Persistent Shout Double Auction", *International Conference on Information and Computation Economies, Proceedings of the first international conference on Information and computation economies*, (1998),11-18.

Reck, Martin, "Formally specifying an automated trade execution system", *Journal of Systems and Software*, 21(3), (Jun. 1993),245-252.

Reck, Martin, "Trading-Process Characteristics of Electronic Auctions", *EM—Electronic Auctions. EM—Electronic Markets*, 7(4), Focus Theme,(Dec. 1997),17-23.

Resnick, Paul, "Reputation systems", *Communications of the ACM*, 43(12), (Dec. 2000),45-48.

Rockoff, Todd, "Design of an Internet-based system for remote Dutch auctions", *Internet Research: Electronic Networking Applications and Policy*, 5(4), (Jan. 1, 1995),10-16.

Schmid, B F., "Electronic Markets—The Development of Electronic Commerce, Electronic Markets", *Newsletter of the Competence Centre, EM—The Development of Electronic Commerce, Electronic Markets*, No. 9/10, (Oct. 1993),3-4.

Siegmann, Ken, "Nowhere to Go but Up", *PC Week*, 12(42), (Oct. 23, 1995),A5(1), 1-3.

Telecomworldwire, "Auction House Moves For Internet Business", *Internet Business News*, Dialog File 636, Access No. 02809791,(Aug. 1995).

Tjostheim, Ingvar, "A case study of an on-line auction for the World Wide Web", *Norwegian Computing Center (NR)*, (1997),1-10.

Turban, E, "Auctions and Bidding on the Internet: An Assessment", *EM—Electronic Auctions. EM—Electronic Markets*, 7(4), (Dec. 1997),7-11.

Van Heck, E, "Experiences with Electronic Auctions in the Dutch Flower Industry", *EM—Electronic Auctions. EM—Electronic Markets*, 7(4), (1997),29-34.

Warbelow, A, "Aucnet: TV Auction Network System", *Harvard Business School Case/Study*, HBVR#9-190-001, (Apr. 1996),1-16.

Zwass, Vladimir, "Electronic Commerce: Structures and Issues", *International Journal of Electronic Commerce*, 1(1), (Fall 1996),3-23.

"U.S. Appl. No. 09/457,466, Appeal Brief filed Sep. 16, 2004", 11 pgs.

"U.S. Appl. No. 09/457,466, Advisory Action mailed Jul. 1, 2004", 2 pgs.

"U.S. Appl. No. 09/457,466, Final Office Action mailed Apr. 13, 2004", 11 pgs.

"U.S. Appl. No. 09/457,466, Final Office Action mailed Nov. 28, 2001", 6 pgs.

"U.S. Appl. No. 09/457,466, Non Final Office Action mailed Mar. 29, 2001", 9 pgs.

"U.S. Appl. No. 09/457,466, Non Final Office Action mailed Jun. 4, 2002", 7 pgs.

"U.S. Appl. No. 09/457,466, Non Final Office Action mailed Oct. 25, 2002", 11 pgs.

"U.S. Appl. No. 09/457,466, Non Final Office Action mailed Oct. 27, 2003", 7 pgs.

"U.S. Appl. No. 09/457,466, Non Final Office Action mailed Nov. 20, 2000", 13 pgs.

"U.S. Appl. No. 09/457,466, Non Final Office Action mailed Dec. 23, 2004", 7 pgs.

"U.S. Appl. No. 09/457,466, Notice of Allowance mailed May 31, 2006", 8 pgs.

"U.S. Appl. No. 09/457,466, Notice of Allowance mailed Aug. 10, 2006", 8 pgs.

"U.S. Appl. No. 09/457,466, Notice of Allowance mailed Nov. 22, 2005", 8 pgs.

"U.S. Appl. No. 09/457,466, Response filed Jan. 4, 2002 to Final Office Action mailed Nov. 28, 2001", 15 pgs.

"U.S. Appl. No. 09/457,466, Response filed Jan. 22, 2004 to Non Final Office Action mailed Oct. 27, 2003", 14 pgs.

"U.S. Appl. No. 09/457,466, Response filed Jan. 23, 2003 to Non Final Office Action mailed Oct. 25, 2002", 8 pgs.

"U.S. Appl. No. 09/457,466, Response filed May 20, 2005 to Non Final Office Action mailed Dec. 23, 2004", 15 pgs.

"U.S. Appl. No. 09/457,466, Response filed Jun. 10, 2004 to Final Office Action mailed Apr. 13, 2004", 13 pgs.

"U.S. Appl. No. 09/457,466, Response filed Jul. 27, 2001 to Non Final Office Action mailed Mar. 29, 2001", 7 pgs.

"U.S. Appl. No. 09/457,466, Response filed Aug. 19, 2002 to Non Final Office Action mailed Jun. 4, 2002", 11 pgs.

"U.S. Appl. No. 09/457,466, Response filed Dec. 21, 2000 to Non Final Office Action mailed Nov. 20, 2000", 8 pgs.

"U.S. Appl. No. 09/620,809, Amendment filed in response to Non-Final Office Action mailed Nov. 3, 2005", 4 pgs.

"U.S. Appl. No. 09/620,809, Preliminary Amendment filed Jul. 22, 2004", 15 pgs.

"U.S. Appl. No. 09/620,809, Response filed Jan. 3, 2005 to Restriction Requirement mailed Nov. 3, 2004", 11 pgs.

"U.S. Appl. No. 09/620,809, Response filed Apr. 2, 2007 to Restriction Requirement mailed Feb. 1, 2007", 9 pgs.

"U.S. Appl. No. 09/620,809, Response filed Sep. 10, 2008 to Final Office Action mailed Jun. 30, 2008", 11 pgs.

"U.S. Appl. No. 09/620,809, Response filed Nov. 21, 2007 to Non-Final Office Action mailed Jun. 21, 2007", 12 pgs.

"U.S. Appl. No. 09/620,809, Restriction Requirement mailed Feb. 1, 2007", 5 pgs.

"U.S. Appl. No. 09/620,809, Restriction Requirement mailed Nov. 3, 2004", 4 pgs.

"U.S. Appl. No. 09/620,809, Advisory Action mailed Apr. 30, 2004", 2 pgs.

"U.S. Appl. No. 09/620,809, Final Office Action mailed Jan. 13, 2004", 14 pgs.

"U.S. Appl. No. 09/620,809, Final Office Action mailed Jun. 30, 2008", 12 pgs.

"U.S. Appl. No. 09/620,809, Non Final Office Action mailed Jun. 18, 2003", 16 pgs.

"U.S. Appl. No. 09/620,809, Non Final Office Action mailed Jun. 22, 2007", 11 pgs.

"U.S. Appl. No. 09/620,809, Non Final Office Action mailed Nov. 3, 2004", 4 pgs.

"U.S. Appl. No. 09/620,809, Non Final Office Action mailed Nov. 3, 2005", 4 pgs.

"U.S. Appl. No. 09/620,809, Non-Final Office Action mailed Nov. 28, 2008", 6 pgs.

"U.S. Appl. No. 09/620,809, Response filed Mar. 15, 2004 to Final Office Action mailed Jan. 13, 2004", 16 pgs.

"U.S. Appl. No. 09/620,809, Response filed Sep. 18, 2003 to Non Final Office Action mailed Jun. 18, 2003", 17 pgs.

Beam, Carrie, et al., "Automated Negotiations: A Survey Center of the State of the Art", *Fisher Center for Information Technology & Management—Walter A. Haas School of Business*, 14 Pages.

Beam, Carrie, et al., "Electronic Negotiation through Internet-based Auctions", *CITM Working Paper 96-WP-1019, Fisher Center for Information Technology & Management—Walter A. Haas School of Business*, (Dec. 1996), 39 Pages.

Kikuchi, Hiroaki, et al., "Multi-Round Anonymous Auction Protocols", *IEICE Trans. Inf. & Syst.*, vol. E82-D, No. 4, (Apr. 1999), 769-777.

Ootake, T., "Monthly Turnover of Ten Million Yen Through Auctions: Stake on EC by Introducing a New System", *Orient Corporation, Nikkei Multimedia*, (Aug. 15, 1998), 92-97.

Teich, Jeffrey, et al., "Multiple-issue auction and market algorithms for the world wide web", *Decision Support Systems*, vol. 26, (1999), 49-66.

U.S. Appl. No. 09/620,809, Response filed Mar. 2, 2009 to Non-Final Office Action mailed Nov. 28, 2008, 10 pgs.

U.S. Appl. No. 09/620,809, Notice of Allowance mailed Jun. 26, 2009, 6 pgs.

Canadian Application No. 2,353,999, Office Action Mailed Apr. 27, 2009, 112.

Japanese Application Serial No. 2000-587289, Office Action mailed May 26, 2009, 5 pgs.

\* cited by examiner

Category Listings — 210

Auction Items — 212

| Home > Browse by Category > Asian Arts > Japanese Arts | | | | |
|---|---|---|---|---|
| Picture | Lot Information | Estimate | Starts at | Date/Time |
| 214-1 IMAGE | 45 characters log title test 1234789012345678 — 216-1<br>Catalog: 123 Collection - Sign up<br>Seller: Alibris | $300-700 | $100 | 05/20 12:00 |
| 214-2 IMAGE | 45 characters log title test 1234789012345678 — 216-2<br>(Live!)      Bid Now / View Live<br>Catalog: Tea and Coffee Vintage Collection - Sign up<br>Seller: Butterfield | $300-700 | $100 | 05/20 12:00 |
| 214-3 IMAGE | 45 characters log title test 1234789012345678 — 216-3<br>Catalog: Lu Lu Estate Sale - Sign up<br>Seller: Lankes | $300-700 | $100 | 05/20 12:00 |
| 214-4 IMAGE | 45 characters log title test 1234789012345678 — 216-4<br>Catalog: Tea and Coffee Vintage Collection - Sign up<br>Seller: Butterfield | $300-700 | $100 | 05/20 12:00 |
| 214-5 IMAGE | 45 characters log title test 1234789012345678 — 216-5<br>Catalog: Lu Lu Estate Sale - Sign up<br>Seller: Lankes | $300-700 | $100 | 05/20 12:00 |
| 214-6 IMAGE | 45 characters log title test 1234789012345678 — 216-6<br>Catalog: Tea and Coffee Vintage Collection - Sign up<br>Seller: Butterfield | $300-700 | $100 | 05/20 12:00 |

For more lots in this category, click these pages: = 1 = 2 3 4 5 6 7 8 9 (next page)

Home | Browse | Search | Registration | Services | Help
Great Collections | eBay | My eBay | Sign in

Seller Console ⸺260

Catalog: Title of catalog 789012345678901234567890123 45
Butterfileds - San Francisco Announcements Lot 123 - Etching by Picasso, Untitled, Bloch 1438

Starts at: $100
Current High Bid: $130
High Bidder: *Floor*

| | | | |
|---|---|---|---|
| Internet: | Accept Internet Bid: | $900.00 | Undo |
| Floor: | Send New Floor Bid: | $500.00 | Undo |
| | Or send this amount: | num only | Send |
| Lots: | Fair Warning | Close | Reopen |
| | Next Lot | | |
| | Open lot #: | | Send |

Message: Type or select a message | Send
Message sent: This is one-of-a-kind piece. Don't let it go!

Auction: Start auction | End auction

Lot 123 of 500    Annoucements

Next lots:
Lot 124 - Haleakala Photograph
Lot 125 - Grand Canyon Photograph
Lot 126 - Arches Natl park Utah Photograph

*FIG. 2D*

METHOD AND APPARATUS FOR HOLDING AN ONLINE LIVE AUCTION TO COMBINE FEATURES OF BOTH THE INTERNET AND TRADITIONAL, REAL WORLD AUCTIONS

This application is a Continuation of U.S. application Ser. No. 09/620,809, filed Jul. 21, 2000, which is a Continuation-In-Part of U.S. application Ser. No. 09/457,466, filed Dec. 8, 1999 now U.S. Pat. No. 7,162,446.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The invention relates generally to the fields of auctioning and online commerce. More particularly, the invention relates to an online live auction format that combines features of both Internet and traditional, real world auctions.

BACKGROUND OF THE INVENTION

With the advent of online auctioning pioneered by eBay Inc., the assignee of the present invention, more and more Internet users are realizing the ease and convenience of buying items online. As the leading person-to-person trading site, buyers are compelled to trade on eBay's web site due to the large amount of content available. Similarly, sellers are attracted to eBay to conduct business where there are the most buyers. Ebay currently provides over two million new auctions, and 250,000 new items every day from which users may choose.

Auction houses that run live, real-time, on-site auctions ("traditional auctions") continue to experience much success. However, geographic barriers, travel costs, and other constraints limit the participation in such auctions.

It is desirable, therefore, to expand the reach of traditional auctions via the Internet. In particular, it would be advantageous to combine the best of both Internet and traditional auctions into a live auction that enables real-time online bids in a live, in person auction.

BRIEF SUMMARY OF THE INVENTION

A method and apparatus are described for conducting a live auction that combines various features of traditional and online auctions. According to one aspect of the present invention, the live auction includes a live, in-person auction component and a real-time online bidding environment component. During the live, in-person auction, bidding information associated with an item in the online bidding environment is updated to reflect a current bid associated with the item in the live, in-person auction. A bid is accepted from an online bidder in the online environment that reflects the online bidder's bid price for the item. Subsequently, the system bids on behalf of the online bidder against one or more live bidders that are participating in the live, in-person auction.

Other features of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIGS. 2A-2C depict exemplary online live auction site screens that allows online bidders to participate in a live auction according to one embodiment of the present invention.

FIG. 2D depicts a seller console according to an exemplary embodiment of the invention.

DETAILED DESCRIPTION

Figure 1:
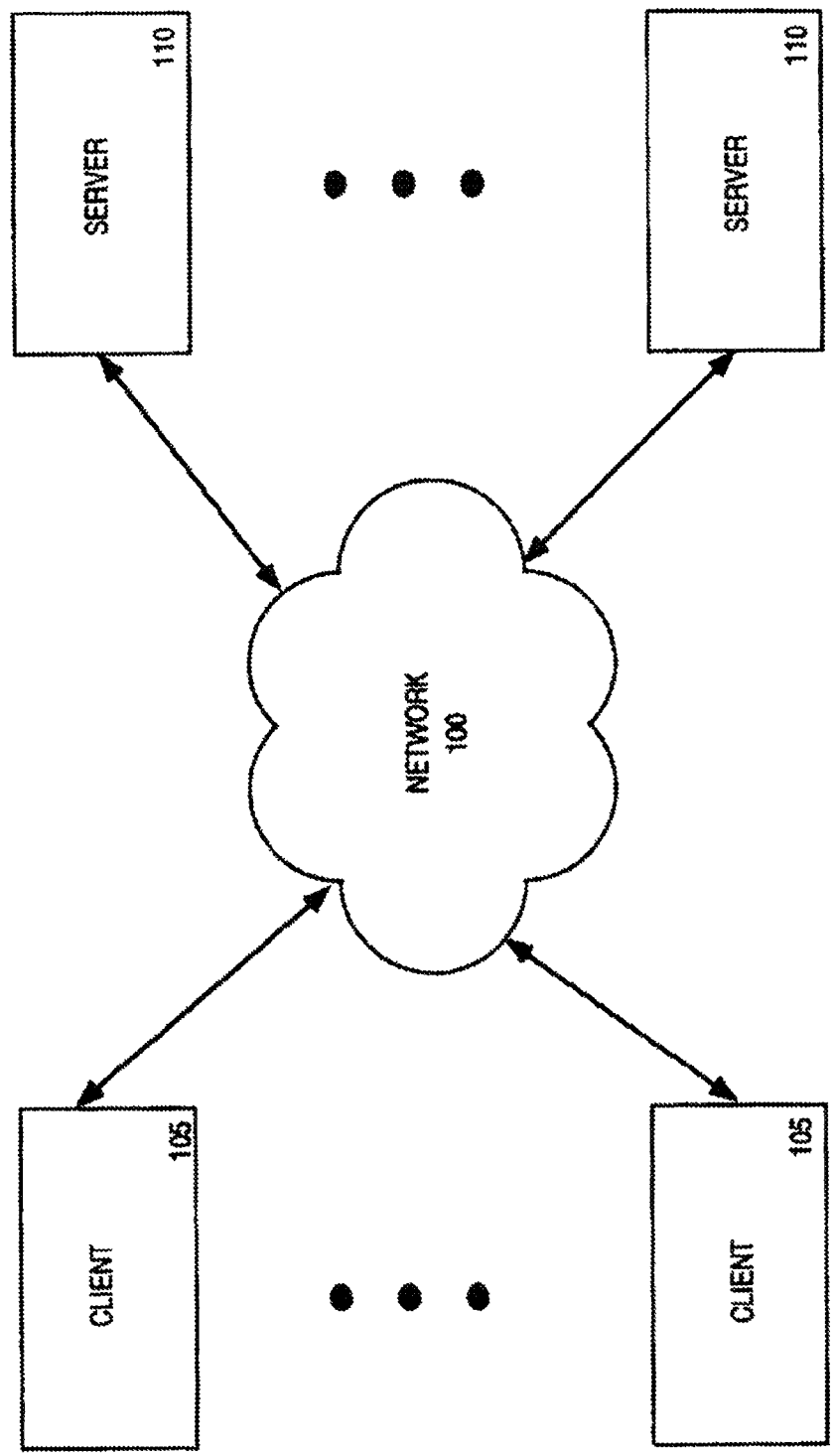
FIG. 1 is a simplified view of an exemplary client-server environment in which the live auction may occur according to one embodiment of the present invention.

A method and apparatus are described for carrying out a live auction that combines various features of traditional and online auctions, thereby enabling real-time online bids in a live, in-person auction. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

As will be described in greater detail below, the present invention includes features that seek to enhance the traditional auctioning experience. According to one embodiment, a live auction combines various features of traditional and Internet auctions (also referred to as online auctions). In a first stage of the live auction, prior to a live, in-person auction, online users are provided access to catalog information for searching and viewing of items available in the live, in-person auction. In addition, during this first stage, any absentee bids are accepted from the online users for items available in the live, in-person auction. Subsequently, in a second stage of the live auction, the live, in-person auction begins. During this stage, bidding information is updated on the online auction site as bids from online bidders as well as live bidders are submitted to the live, in-person auction. During a final end of auction stage, the item is awarded to the highest bidder. An auction house, such as for example Butterfields, conducts the live, in-person auction. Advantageously, in this manner, the reach of traditional auctions may be expanded via the Internet, thereby enabling real-time online bidding in a live, in-person auction.

In the preferred embodiment, the steps of the present invention are embodied in machine-executable instructions. The instructions can be used to cause a general purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Client-Server Environment

FIG. 1 is a simplified view of an exemplary client-server environment, such as the World Wide Web (the Web), in which the online portion of a live auction may take place. The architecture of the Web follows a conventional client-server model. The terms "client" and "server" are used to refer to a computer's general role as a requester of data (the client) or provider of data (the server). Web clients 105 and Web servers 110 communicate using a protocol such as HyperText Transfer Protocol (HTTP). In the Web environment, Web browsers reside on clients and render Web documents (pages) served by the Web servers. The client-server model is used to communicate information between clients 105 and servers 110. Web servers 110 are coupled to the Internet 100 and respond to document requests and/or other queries from Web clients 105. When a user selects a document by submitting its Uniform Resource Locator (URL), a Web browser, such as Netscape Navigator or Internet Explorer, opens a connection to a server 110 and initiates a request (e.g., an HTTP get) for the document. The server 110 delivers the requested document, typically in the form of a text document coded in a standard markup language such as HyperText Markup Language (HTML).

Exemplary Online Auctioning Site Interface

Figure 2A:

FIG. 2A is an exemplary online live auction site screen that allows online bidders to participate in a live, in-person auction. According to one embodiment, when an online bidder wishes to participate in, or inquiry into Live Auctions, the online user is presented with the Live Auctions Home Page screen (Live Auction Screen) 200. The Live Auction Screen 200 provides a listing of all catalogs available in various live, in person auctions in which the online user may bid. From the Live Auction screen 200, the online user is forwarded to various screens that will allow the user to search and view items, listen or view live, in-person auctions and submit real-time bids in the live, in-person auctions.

FIG. 2B is an exemplary online live auction site screen that allows online bidders to participate in a live, in-person auction. According to one embodiment, when an online bidder makes a request to search and view a catalog for items available in the live, in-person auction, category listings screen 210 is presented with a textual list of items 2 12. In this example, each item 214 (214-1, 214-2, ..., 214-6) includes a hypertext link 216 (216-1, 216-2, ..., 216-6) having a picture of the item, a title, a brief description, a high/low estimate and a starting price. Responsive to the selection of the hypertext link 215, a subsequent screen (not shown) displays the item and allows the online user to enter an absentee bid for the item 210, when the user will be unavailable during the live, in-person auction. As will be described further below, by providing an absentee bid amount, an absentee bidding system may bid on behalf of the absentee bidder as necessary by increasing the online bidder's bid by the current bid increment until the absentee bid is reached. Advantageously, in this manner, the absentee bidder need not keep track of the auction as it proceeds and is assured he/she will not be outbid at the last minute—unless the absentee bid is exceeded. However, once the absentee bid is exceeded, the absentee bidder has no chance to win the item.

Figure 2C:
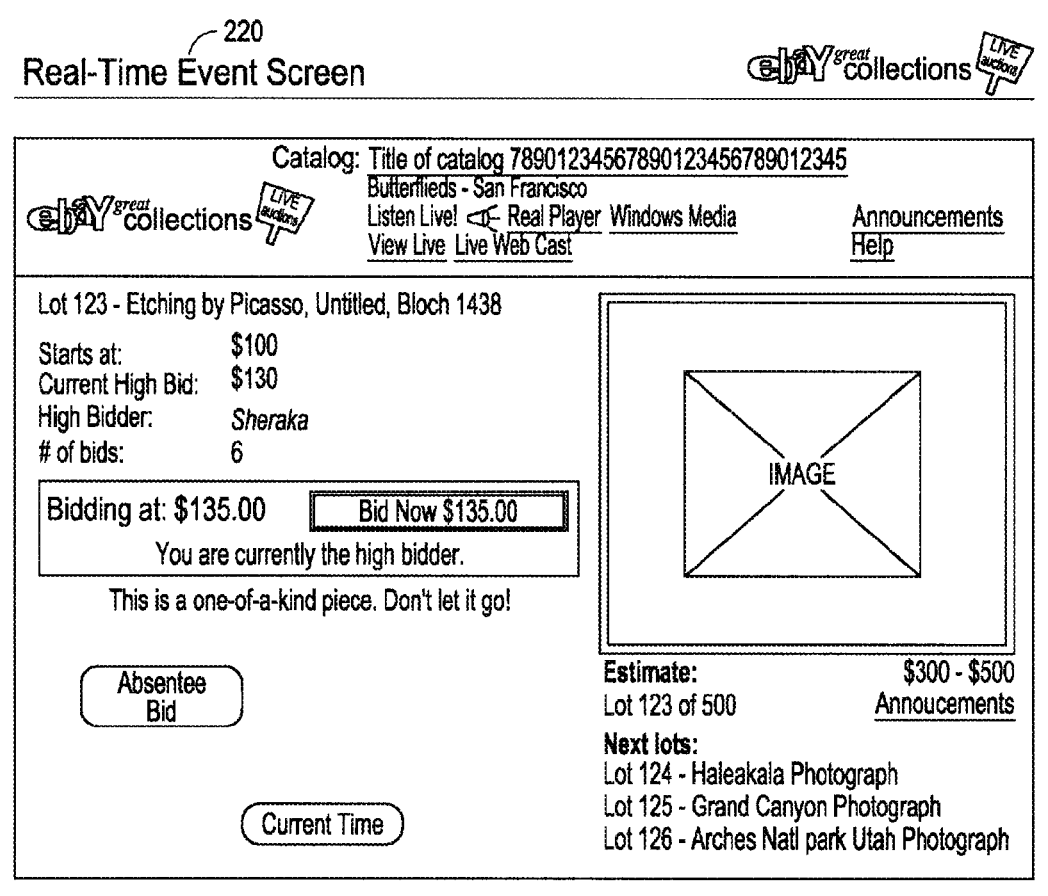

FIG. 2C is an exemplary online live auction site screen that allows online bidders to submit bids in a live, in-person auction. According to one embodiment, when an online bidder makes a request to participate in the live, in-person auction, the user is directed to a real-time event screen 220. The real time event screen 220 is automatically updated to reflect the current lot on sale and also includes the name of the seller and the catalog. As described herein, a lot refers to one item or a group of items that will be auctioned together as part of a sale. Screen 220 also includes the following: a lot number, a lot picture, current price, current high bidder, bid button for automatic bids, bid box for bids above the current price, amount of absentee bid previously placed by any user, on/off button for live webcasts, a promotional message, link to the corrigenda (announcements), titles of next three supporting lots, and the current time.

The real-time event screen 220 enables online bidders to either view or listen to the live, in-person auction. Depending on the option the online bidder selects an audio or audio/video stream is sent to the online bidder's computer. The stream is originated at the auction house and generally captures the auctioneer's actions. The audio stream is provided in, for example, Windows or Real Player formats. Implementation details regarding video and audio streaming over the Internet are known to those skilled in the art and are therefore not provided herein.

FIG. 2D depicts an exemplary floor/internet live auction interface (seller console) 260. The live auction seller console 260 allows sellers to accept and communicate Internet bids, update current bid, and call prices and allows opening and closing of lots. The seller console 260 allows bidders, whether on the floor or on the Internet, to participate in the live in-person auction simultaneously and on equal footing.

Figure 2E:
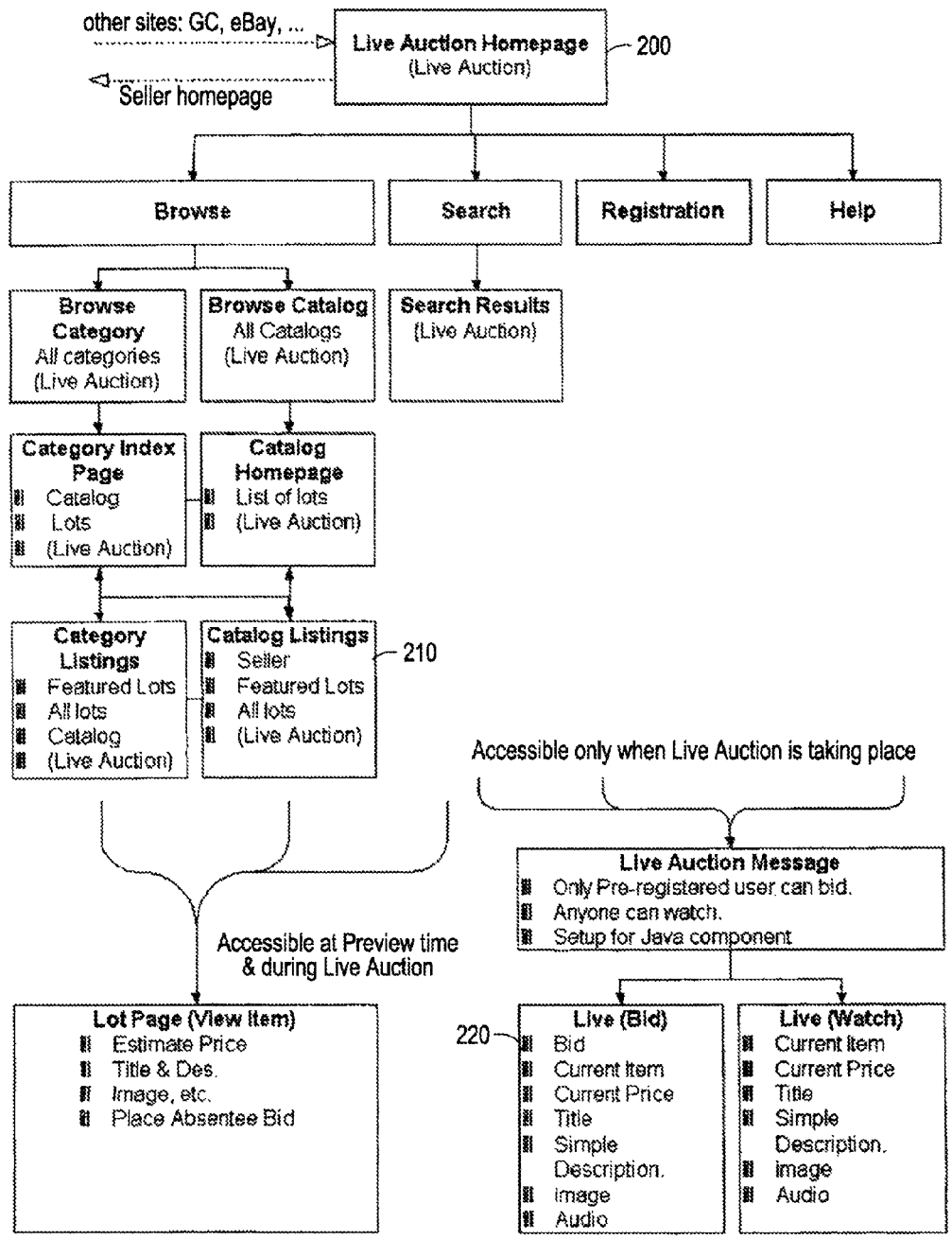
FIG. 2E depicts a Live Auction Site Information Architecture according to an exemplary embodiment of the invention.

FIG. 2E depicts the Live Auction Site Information Architecture 280. The information architecture is provided as an exemplary high level map for navigation of the Live Auction screen 200, as described above. From the Live Auction screen 200, the users may browse or search items, registers for Live Auction, or seek help. Browsing and search of items eventually leads the user to the category listing screen 210, as described above. Once a live, in-person auction begins, the user may submit real-time online bids via the real-time event screen, as described above.

Exemplary Computer System

Figure 3:
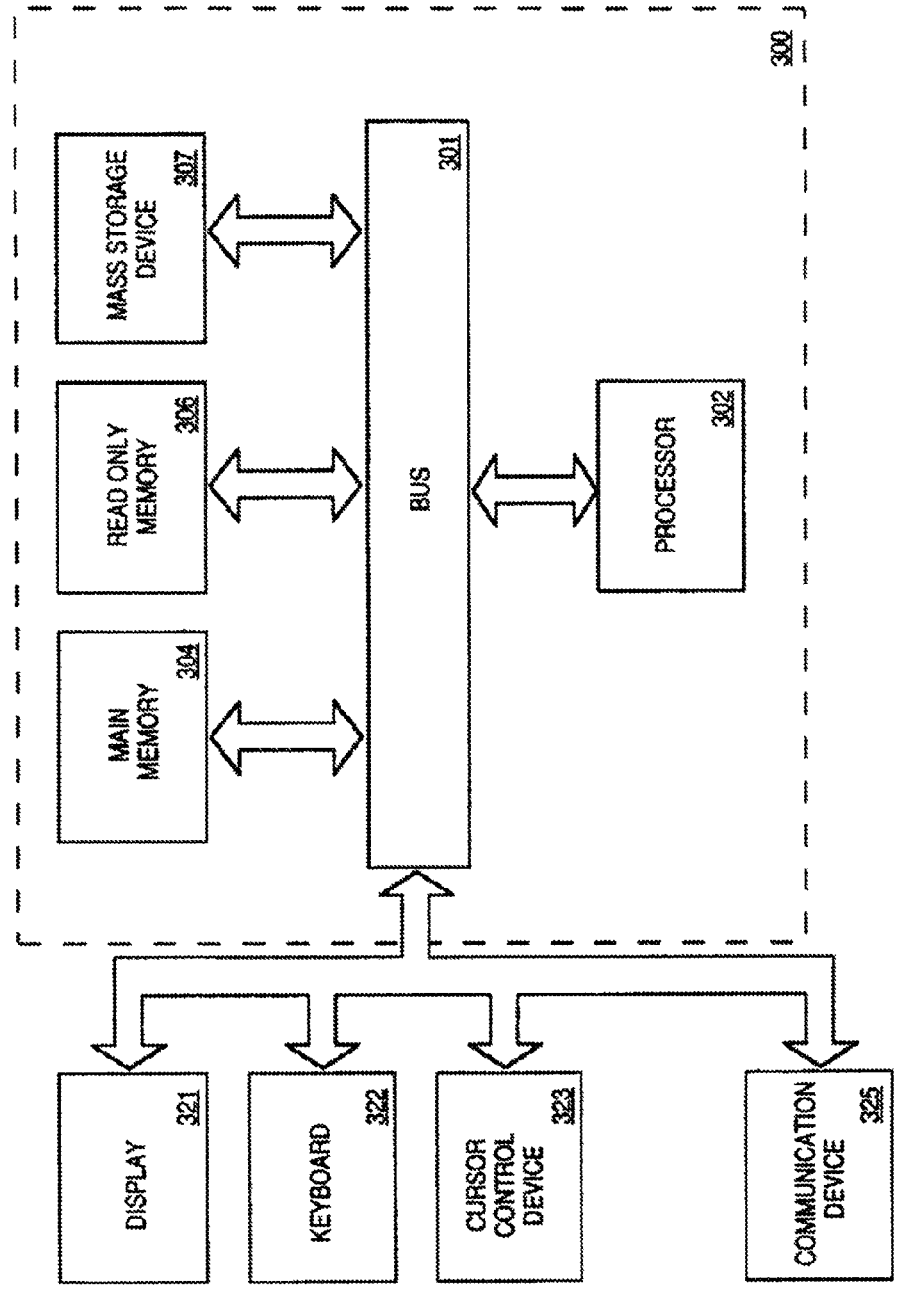
FIG. 3 is an example of a computer system upon which one embodiment of the present invention may be implemented.

A computer system 300 representing an exemplary server in which features of the present invention may be implemented will now be described with reference to FIG. 3. Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to a computer user. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301 for accessing remote servers via the Internet, for example. The communication device 325 may include a modem, a network interface card, or other commercially available network interface devices, such as those used for coupling to an Ethernet, token ring, or other type of network. In any event, in this manner, the computer system 300 may be coupled to a number of clients and/or other servers via a conventional network infrastructure, such as a company's Intranet and/or the Internet, for example.

System Overview

Figure 4:
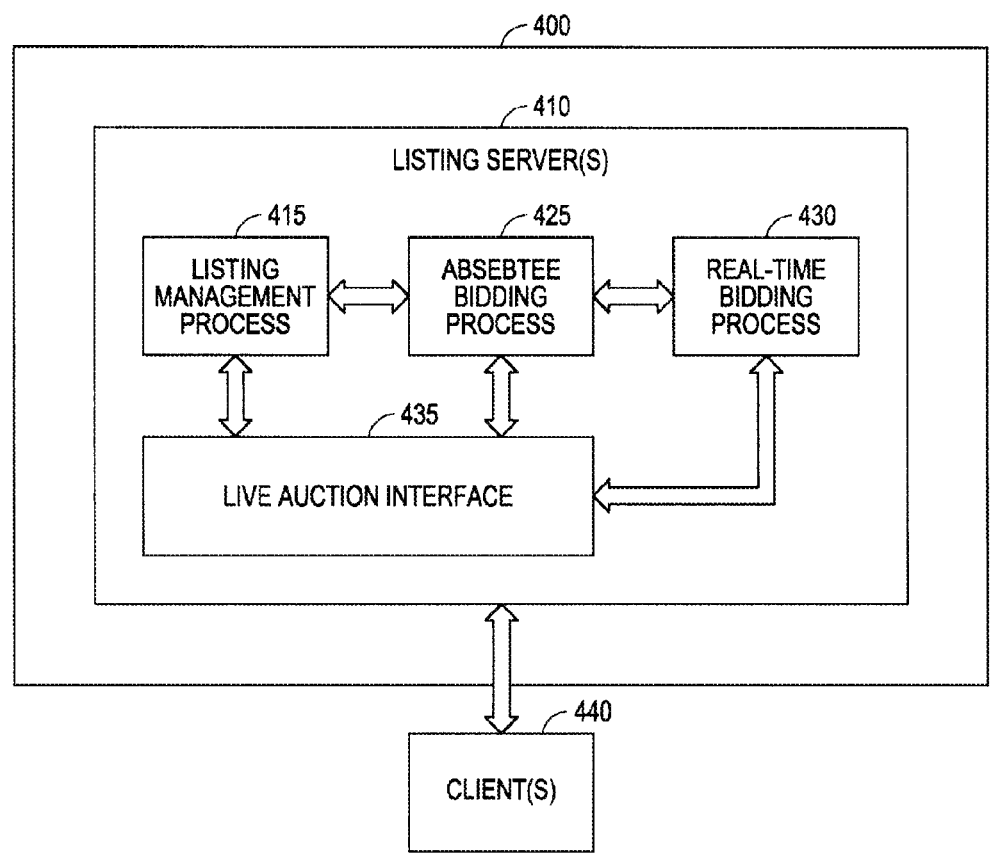
FIG. 4 is a high level illustration of the interaction between various devices and processes according to one embodiment of the present invention.

FIG. 4 is a high level illustration of the interaction between various devices and processes according to one embodiment of the present invention. According to the embodiment depicted, an online, live auction site system 400 may comprise one or more listing servers 410. In this example, the listing servers 410 include a listing management process 415, an absentee bidding process 425, a real-time bidding process 430 and a live auction interface 435. Clients 440 interact with the listing management process 415 and the absentee bidding process 425 to view information about items for sale in the live, in-person auction and submit absentee bids, respectively.

The listing management process 415 interacts with online bidders and provides them with catalog information about the items in which they are interested. The listing management process 415 may support a text-based item listing format, such as that depicted in FIGS. 2A and 2B, and/or a Gallery™ presentation format that includes thumbnail images of the items for sale as described in co-pending U.S. patent application Ser. No. 09/177,726, entitled "Information Presentation and Management in an25 Online Trading Environment" and assigned to the assignee of the present invention. (GALLERY is a trademark of eBay Inc. of San Jose, Calif.).

The absentee bidding process 425 tracks bids submitted by online bidders for the items 210 available in the live, in-person auction. Based upon the bid amounts received, the absentee bidding process 425 selects an absentee bid as the second highest absentee bid received plus a one bid increment amount as listed in a bid increment table provided by the seller.

The live auction interface 435 provides an interface that updates bidding information associated with an item in the online environment to reflect a current bid associated with the item in the live, in-person auction. A real-time bidding process 430 accepts bids from the online bidders, via the live auction interface, reflecting the online bidder's bid price for the item, and bids on behalf of the online bidder against one or more live bidders that are participating in the live, in-person auction. The real-time bidding process 430 in conjunction with the live auction interface 435 enables real-time online bidding in the live, in-person auction While, in order to facilitate explanation, the listing servers 410 are generally discussed as if they were a single device, in actuality, the listing servers 410 may comprise multiple physical and/or logical devices connected in a distributed architecture, and the various functions performed may actually be distributed among multiple devices. For example, any function can be implemented on any number of machines or on a single machine. Also, any process may be divided across multiple machines.

Figure 5:
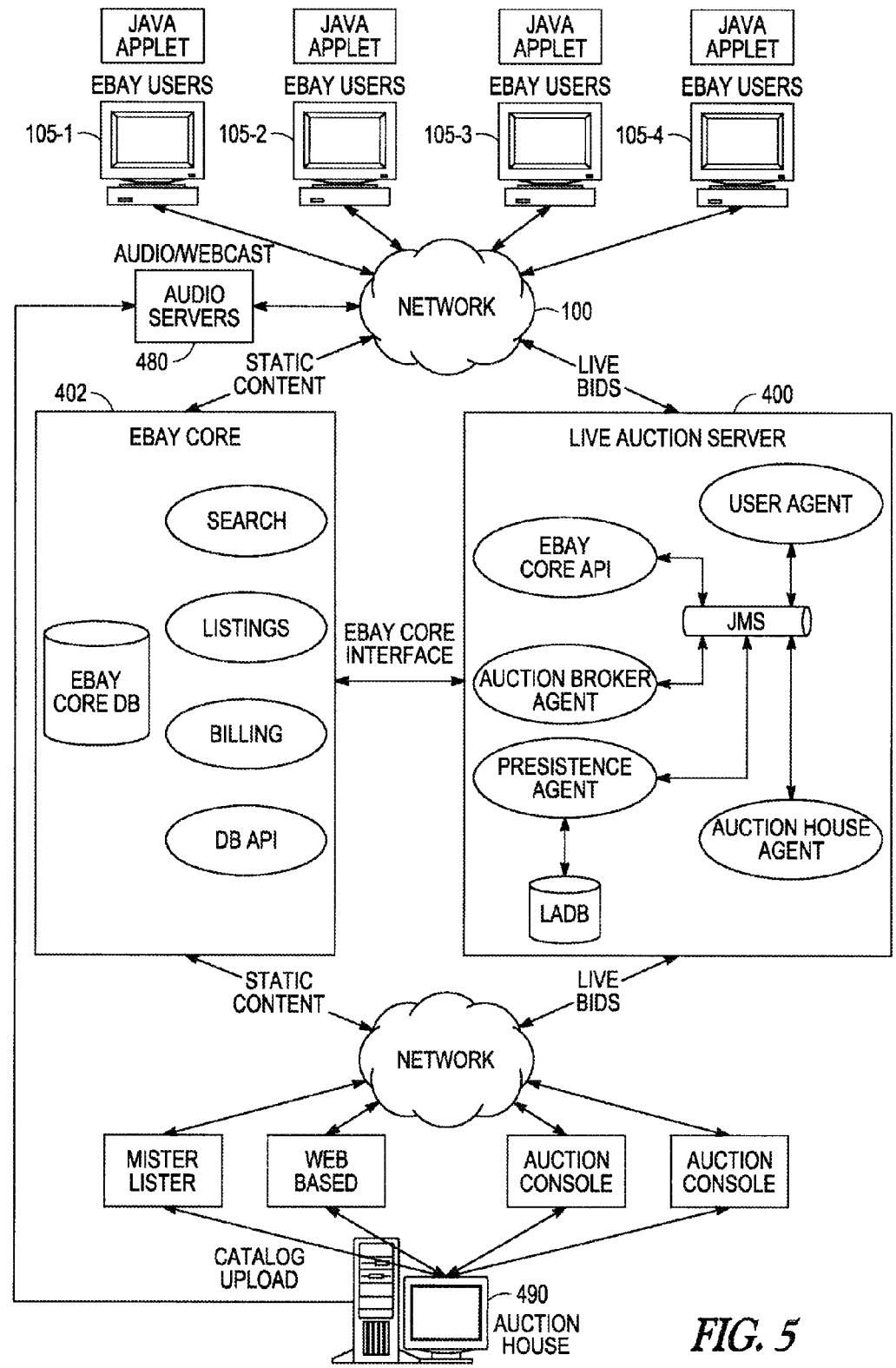
FIG. 5 depicts an exemplary high-level system architecture implementation of the present invention.

FIG. 5 depicts an exemplary high-level system architecture implementation 450 of the Live Auction System 400. The exemplary system architecture 450 incorporates various aspects of FIGS. 1, 3 and 4. Online user 105 (105-1, 105-1, . . . , 105-4) interaction with the live auction system 400 as well as auction house 490 interaction with the live auction system 400 is depicted. An audio server 480 for providing a webcast to online bidders during the live, in-person auction is also depicted. The system architecture 450 is illustrated to provide a high level view of the various components required to implement the live auction system 400. Specific implementation details are provided above with reference to FIGS. 1, 3 and 4, as well as the knowledge available to those skilled in the art to which this invention pertains.

Exemplary Stages of an Integrated Auction

Figure 6:
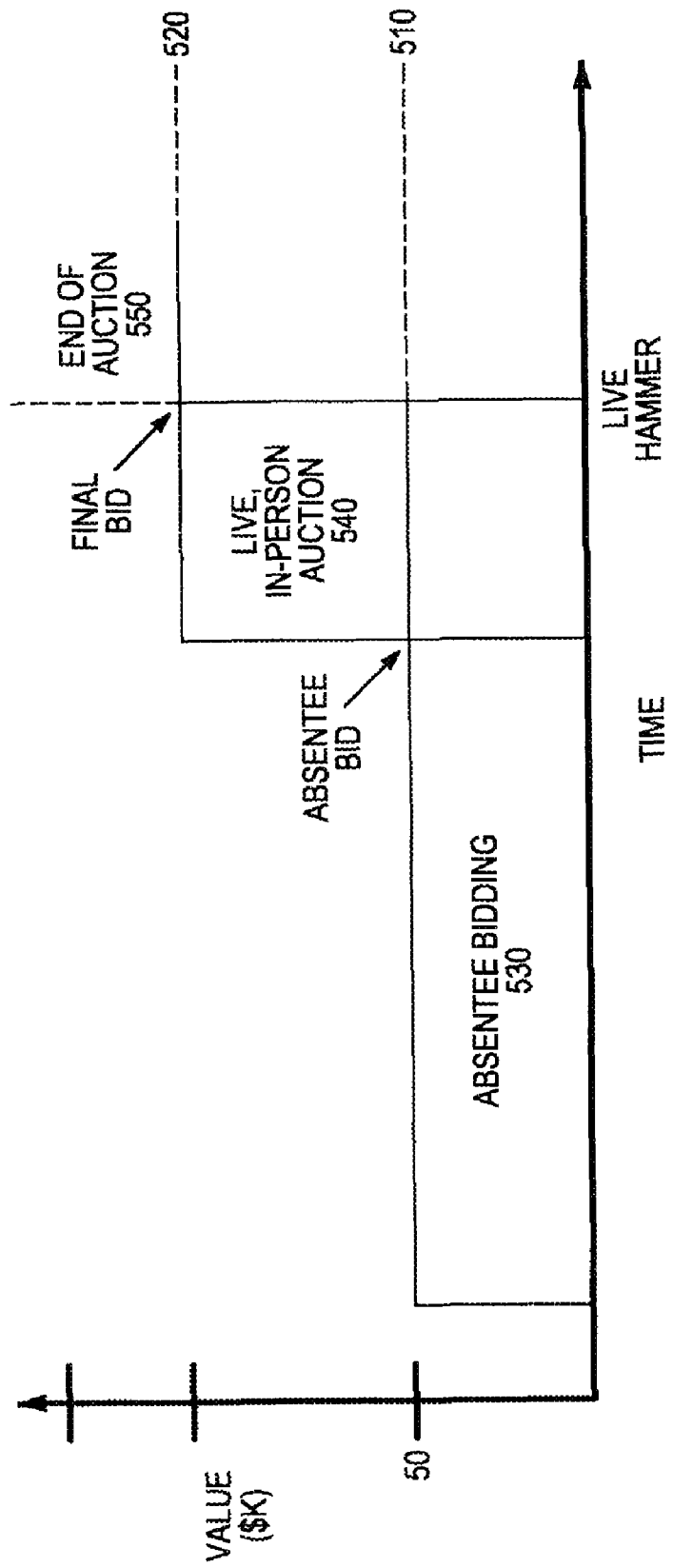
FIG. 6 conceptually illustrates the stages of a live auction according to one embodiment of the present invention.

FIG. 6 conceptually illustrates the stages of a live auction according to one embodiment of the present invention. In this example, a live auction comprises three separate and distinct stages: a pre-auction stage 530, a real-time bidding stage 540, and an end auction stage 550. During the pre-auction stage 530, online users are allowed to search and view items available during the live, in-person auction. In addition, online users that will be unavailable to submit real time bids during the live, in-person auction may submit absentee bids. An absentee bid 510 will be chosen from the absentee bids received during the pre-auction stage 530 and submitted during the live, in-person auction as described below.

Although absentee bids are not required by the present invention, FIG. 6 depicts a final absentee bid 510 chosen in the amount of $50,000. The choice of a final absentee bid 5 10 signals the beginning of the real-time bidding stage 540. During the real-time bidding stage 540, online bidders bid against other online bidders as well as one or more live bidders that are present at the live, in-person auction. Referring again to FIG. 5, a final bid amount 520 is accepted that exceeds the absentee bid 510 received during the pre-auction stage 530 and signals the beginning of the end-of-auction stage 550. During the end-of-auction stage 550, an online user that enters the final bid is notified via e-mail.

Live Auction Flow

Figure 7A:
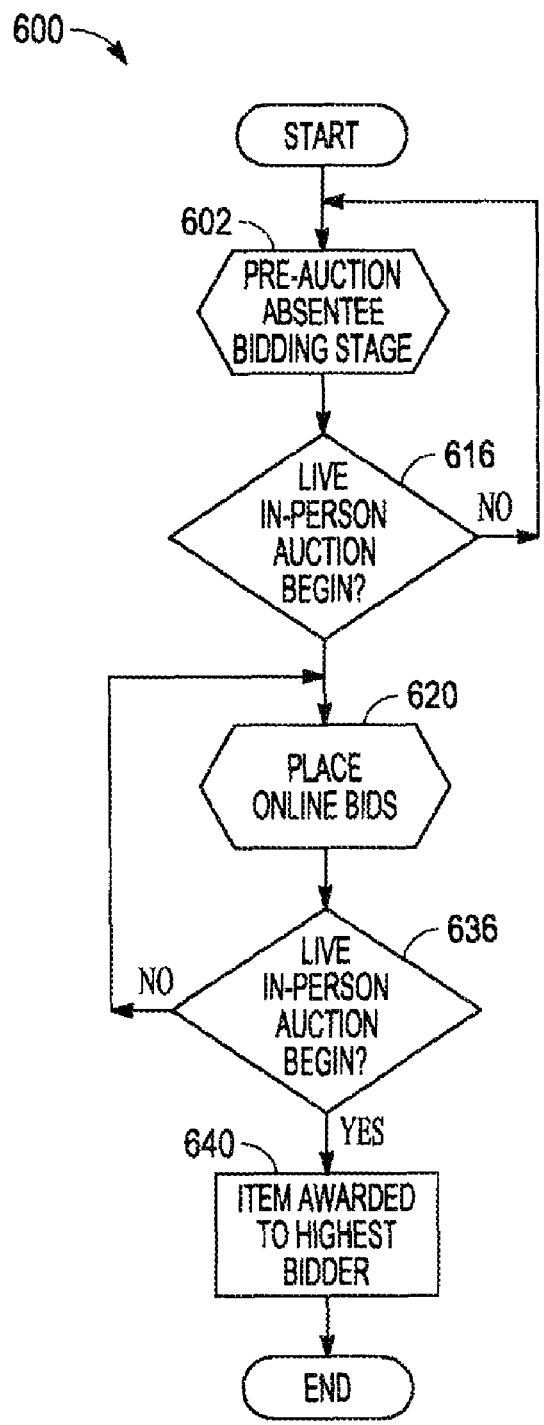
FIGS. 7A-7C are flow diagrams illustrating live auction processing according exemplary embodiments of the present invention.

Procedural method steps for implementing the live auction as described by the present invention are now provided. Referring now to the flow diagram of FIG. 7A, exemplary live auction processing 600 will now be described. At step 602, the live auction begins with the pre-auction absentee bidding stage 530 in which absentee bids are submitted by online users. The pre-auction bidding stage 602 continues until the start of the live, in-person auction at step 616. During the live, in-person auction, the live auction system 400 bids on behalf of any online bidders against one or more live bidders that are participating in the live, in-person auction at step 620, thereby enabling real-time online bidding in the live, in-person auction. Online bids are placed by the live auction system 400 until the live, in-person auction terminates at step 636. Finally, at step 640, the item for bid is awarded to the highest bidder.

Figure 7B:
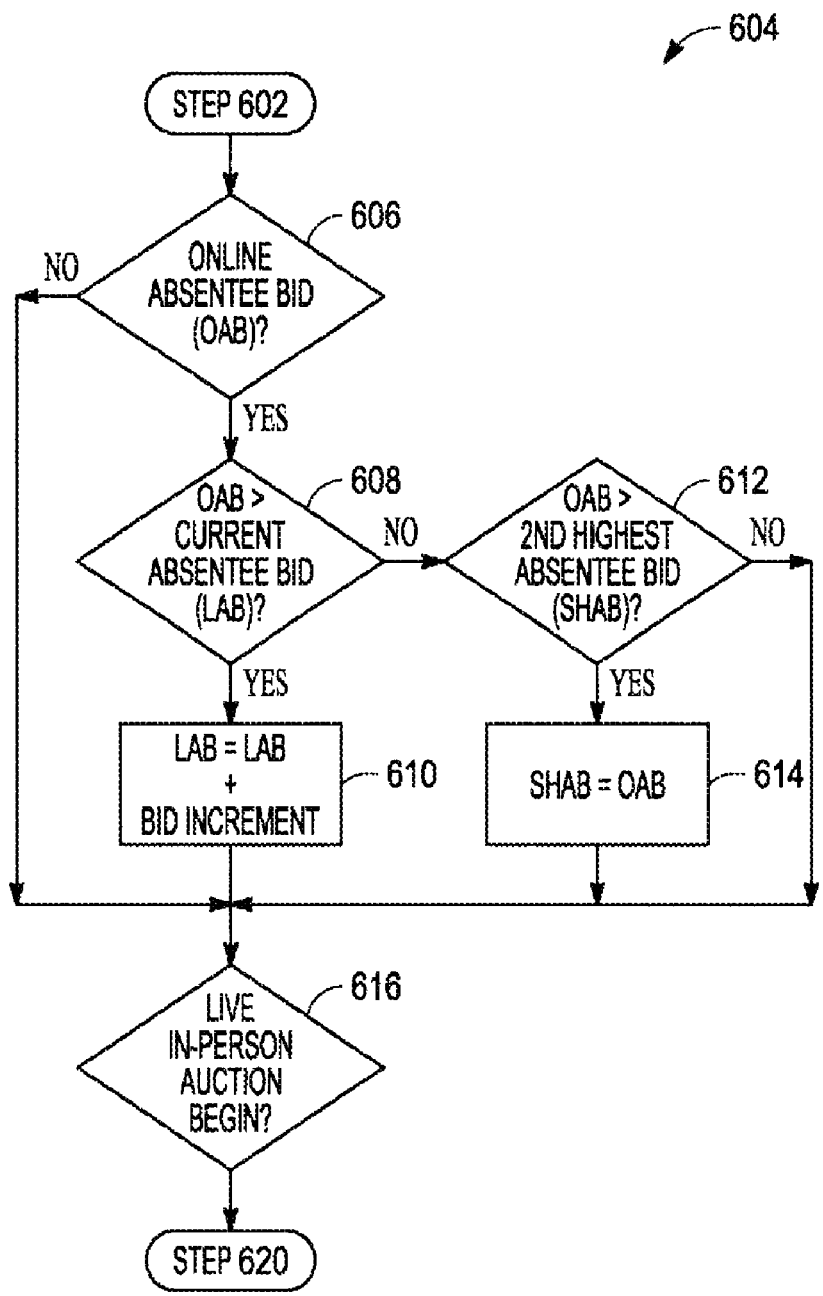

FIG. 7B depicts additional method steps 604 for implementing the pre-auction absentee bidding stage 530 of step 602. At step 606, the pre-auction online bidding stage 530, begins with the receipt of any online absentee bids. As described above, the receipt of absentee bids is optional and is not required for the implementation of the live auction. At step 608, an absentee bid is received and compared with any current absentee bids received by the live auction system. At 610, when the online absentee bid is greater than the current absentee bids received by the system 400, the current absentee bid is updated to equal the current absentee bid plus a bid increment provided by the seller in a bid increment table. Otherwise, at step 612, if the online absentee bid received at step 606 is greater than a second highest absentee bid received by the system 400, step 614 is initiated. At step 614, the second highest absentee bid is set to the online absentee bid received at step 606. Otherwise the online absentee bid received at step 606 is discarded. As described above, the pre-auction absentee bidding stage 602 continues until the start of a live, in-person auction at step 616.

Figure 7C:
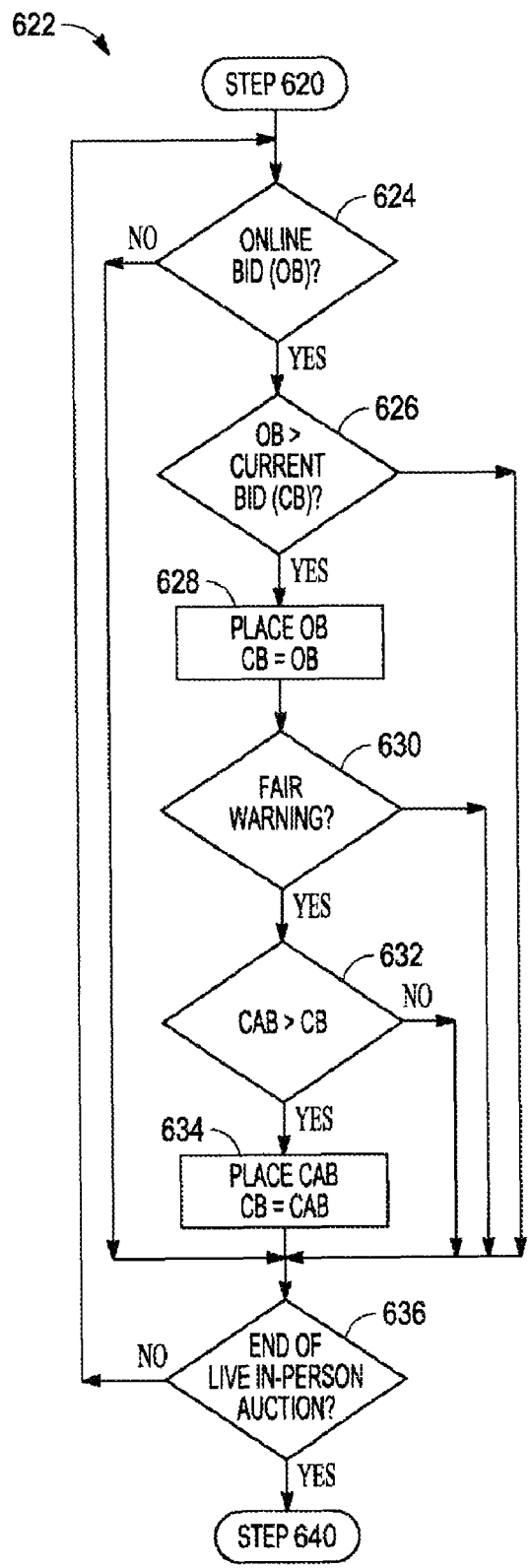

FIG. 7C depicts additional method steps 622 for implementing the real-time online bidding stage 540 of step 620. At step 624, online bids are received. Once an online bid is received, at step 620 the online bid is compared with the c m n t bid of the live, in-person auction. At step 628, if the online bid is greater than the current bid, the online bid is placed in the live, in-person auction. Otherwise the online bid is discarded. At step 630, when fair warning is indicated, step 632 is initialized. At step 632, the highest accepted current absentee bid is compared with the current bid in the live in-person auction. At step 634, if the current absentee bid is greater than the current bid in the live in-person auction, the current absentee bid is converted to the current bid in the live, in-person auction. Otherwise at 632 the absentee bid is discarded. As described above, the real-time online bidding stage 540 continues until the end of the live, in-person auction at step 636. As described with reference to FIG. 6A, the end of the live, in-person auction results in the occurrence of the end-of-auction stage 550 in which the item is awarded to the highest bidder. Assuming the highest bidder is an online bidder, the live auction system notifies the online bidder via email.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method comprising:
    transmitting, via a communication device, to one or more remote auction bidders information about an item being auctioned at a live auction site;
    receiving, via the communication device, one or more remote auction bids from the one or more remote auction bidders for the item being auctioned;
    choosing, via a computer, as a starting bid in the live auction a highest bid from one or more remote auction bids;
    processing, using the computer, onsite auction bids from one or more onsite auction bidders for the item being auctioned using the starting bid;
    accepting, by an auctioneer of the live auction site, using the computer, an auction bid, wherein the accepted auction bid is selected from a plurality of onsite auction bids and the starting bid; and
    transmitting, via the communication device, information regarding the acceptance and rejection of the onsite and remote auction bids to at least one remote auction bidder, wherein the acceptance and rejection of the onsite and remote auction bids is determined by an auctioneer of the live auction site.

2. The computer-implemented method of claim 1 further comprising:
    capturing live audio and video data at the live auction site; and
    streaming the captured live audio and video data to one or more remote auction bidders.

3. A system comprising:
    a live auction interface operable, using a computer, to process onsite and remote auction bids from one or more onsite auction bidders and remote auction bidders for an item being auctioned at a live auction site by an auctioneer to transmit, via a communication device, to one or more of the remote auction bidders information pertaining to the item being auctioned, and to transmit to the one or more remote auction bidders information regarding acceptance and rejection of the onsite and remote auction bids; and
    a real time bidding processor to receive remote auction bids from the one or more remote auction bidders for the item being auctioned, choose as a starting bid in the live auction a highest bid from the remote auction bids, and to bid at the live auction site on behalf of the remote auction bidder of the highest bid.

4. The system of claim 3, wherein the transmitting of the information pertaining to the item being auctioned and the information regarding the acceptance and rejection of the onsite and remote bids is performed over a network infrastructure.

5. The system of claim 3, wherein the information pertaining to the item being auctioned is selected from the group consisting of text-based item listings, thumbnail images, streaming audio, and streaming video.

6. A computer-implemented method comprising:
    presenting, using a computer, information about a live auction to one or more online attendees of the live auction;
    receiving, via a communication device, online bids from the one or more online attendees;
    choosing, via the computer, as a starting bid in the live auction a highest bid from the online bids;
    presenting, using the computer, the starting bid to an auction conductor;
    receiving, via the communication device, a live bid, wherein the live bid was submitted to the auction conductor by a live attendee of the live auction; and
    presenting, using the computer, the live bid to the online attendee bidding the highest bid.

7. The computer-implemented method of claim 6 further comprising:
    presenting, using the computer, the highest bid to live attendees of the live auction.

8. The computer-implemented method of claim 6 further comprising:
    receiving, via the communication device, a final auction bid, wherein the final auction bid is a bid accepted by the auction conductor.

9. The computer-implemented method of claim 6 further comprising:
presenting, using the computer, information about acceptance of at least one of the live bid and the online bid to the online attendee.

10. The computer-implemented method of claim 9, wherein the information about acceptance of at least one of the live bid and the online bid includes audio and video information.

11. The computer-implemented method of claim 6, wherein the information about the live auction includes audio and video information.

12. The computer-implemented method of claim 6, wherein the presenting of the live bid to the online attendee occurs in near real-time.

13. A machine-readable medium including instructions which when executed by a machine cause the machine to perform the method of claim 7.

14. An apparatus comprising:
a first device configured to present information to online bidders of an integrated live and online auction, the information being about an item for sale at the integrated live and online auction;
a second device to receive online bids from the online bidders, wherein the online bids are associated with the item, the second device to choose as a starting bid in the integrated live and online auction a highest bid from online bids received from the online bidders; and
a live auction interface configured to present the starting bid to live bidders at the integrated live and online auction.

15. The apparatus of claim 14, wherein the information includes thumbnail images of the item.

16. The apparatus of claim 14, wherein the information includes textual information.

17. The apparatus of claim 14, wherein the live auction interface is to receive, via the second device, a final bid which was accepted by an auction conductor.

18. The apparatus of claim 14 further comprising:
a third device configured to present audio and video information about progress of the integrated live and online auction.

19. The apparatus of claim 14 further comprising:
a third device configured to conduct a teleconference including the live bidders and online bidders, the teleconference to monitor the progress of the integrated live and online auction.

20. A machine-readable medium including instructions which when executed by a machine cause the machine to perform operations comprising:
integrating online bidders with live bidders to form an integrated auction for selling an item, the integrating including,
transmitting audio and video information to the online bidders, the audio and video information indicating progress of the integrated auction;
receiving bids associated with the online bidders and the live bidders;
choosing as a starting bid in a live auction a highest bid from one or more remote auction bids; and
presenting certain of the bids including the starting bid to an auction conductor, the online bidders and the live bidders.

21. The machine-readable medium of claim 20 to perform operations further comprising:
receiving a final auction bid, wherein the final auction bid is a bid accepted by the auction conductor.

22. The machine-readable medium of claim 20 to perform operations further comprising:
presenting the final auction bid to the online bidders and the live bidders.

23. The machine-readable medium of claim 20, wherein the bids associated with the live bidders were submitted by the live bidders to the auction conductor.

24. The machine-readable medium of claim 20, wherein the online bidders receive the certain of the bids in near real-time.

25. The machine-readable medium of claim 20 to perform operations further comprising:
presenting textual information about the item to the online bidders.

26. A computer-implemented method comprising:
capturing, using a computer, live audio and video data at a live auction with an auctioneer;
transmitting, via a communication device, the captured live audio and video data to one or more remote auction bidders, each remote auction bidder operating a bidding device, enabling remote auction bidders to hear the auctioneer and view real-time video from the live auction site, the live audio and video being received along with information regarding an item being auctioned at the live auction site and information regarding acceptance and rejection of onsite and remote auction bids over an IP network, the bidding device being operable to receive and transmit auction bids for the item being auctioned;
transmitting, via the communication device, to the one or more remote auction bidders information regarding the item being auctioned;
receiving, via the communication device, auction bids from the one or more remote auction bidders for the item being auctioned;
choosing as a starting bid in the live auction, via using the computer, a highest bid from auction bids received from the one or more remote auction bidders;
processing, using the computer, auction bids from one or more onsite auction bidders and the starting bid for the item being auctioned at the live auction site;
accepting an auction bid, the auction bid being accepted by the computer used by the auctioneer and the accepted auction bid is selected from a plurality of onsite auction bids and the starting bid; and
transmitting information regarding the acceptance and rejection of the onsite and remote auction bids to at least one remote bidding device.

27. The computer-implemented method of claim 26, wherein the information regarding the acceptance and rejection of the onsite and remote auction bids includes audio and video information.

28. The computer-implemented method of claim 26, wherein the bidding device is computer.

29. A system to integrate a remote auction audience with an onsite auction audience, the system comprising:
a first computer system to process auction bids from one or more onsite auction bidders and remote auction bidders for an item being auctioned at a live auction site, wherein the processing of the auction bids include choosing as a stating bid in the onsite auction a highest bid from the auction bids from the one or more remote auction bidders; and a second computer system using a communication device to:

transmit to one or more remote auction bidder's information pertaining to the item being auctioned, receive auction bids from the one or more remote auction bidders for the items being auctioned; and transmit to the one or more remote auction bidders information regarding the acceptance and rejection of the onsite and remote auction bids;

the first and second computer systems operating under direction of an auctioneer.

* * * * *

UNITED STATES PATENT AND TRADEMARK OFFICE
CERTIFICATE OF CORRECTION

PATENT NO. : 7,797,222 B2  Page 1 of 1
APPLICATION NO. : 11/264526
DATED : September 14, 2010
INVENTOR(S) : Daniele Levy et al.

It is certified that error appears in the above-identified patent and that said Letters Patent is hereby corrected as shown below:

On the Title Page, Item (57), under "Abstract", line 9, delete "is be" and insert -- is to be --, therefor.

On page 4, in column 2, under "Other Publications", line 1, after "Survey" delete "Center".

In column 1, line 36, delete "Ebay" and insert -- eBay --, therefor.

In column 6, line 6, after "auction" insert -- . --.

In column 10, line 39, in Claim 26, after "via" delete "using".

Signed and Sealed this

Sixteenth Day of November, 2010

David J. Kappos
*Director of the United States Patent and Trademark Office*